United States Patent
So et al.

(10) Patent No.: US 11,920,038 B2
(45) Date of Patent: Mar. 5, 2024

(54) METHOD FOR MANUFACTURING PROCESSED CORK CHIP AND METHOD FOR CONSTRUCTING FLOOR USING SAME

(71) Applicant: A-ROAD CO., Gangwon-do (KR)

(72) Inventors: Nam Woo So, Seoul (KR); Sung Hwan So, Seoul (KR)

(73) Assignee: A-ROAD CO., Hongcheon-Gun (KR)

( * ) Notice: Subject to any disclaimer, the term of this patent is extended or adjusted under 35 U.S.C. 154(b) by 772 days.

(21) Appl. No.: 16/770,586

(22) PCT Filed: Dec. 3, 2018

(86) PCT No.: PCT/KR2018/015206
§ 371 (c)(1),
(2) Date: Jun. 5, 2020

(87) PCT Pub. No.: WO2019/112272
PCT Pub. Date: Jun. 13, 2019

(65) Prior Publication Data
US 2021/0163747 A1 Jun. 3, 2021

(30) Foreign Application Priority Data
Dec. 8, 2017 (KR) .......................... 10-2017-0168251

(51) Int. Cl.
*C08L 97/00* (2006.01)
*B27K 3/50* (2006.01)
(Continued)

(52) U.S. Cl.
CPC .............. *C08L 97/007* (2013.01); *B27K 3/50* (2013.01); *B27M 1/08* (2013.01); *B27M 3/04* (2013.01);
(Continued)

(58) Field of Classification Search
CPC ......... C08L 97/007; C08L 75/02; B27K 3/50; B27M 1/08; B27M 3/04; B27N 3/02; B29C 65/483; B32B 37/12; E04B 5/43
See application file for complete search history.

(56) References Cited

U.S. PATENT DOCUMENTS

| 6,320,066 B1 | 11/2001 | Audenaert et al. |
| 2007/0129527 A1* | 6/2007 | Griswold ........... C08G 18/4277 528/64 |
| 2011/0308730 A1* | 12/2011 | Walther ................. C09J 175/04 156/331.7 |

FOREIGN PATENT DOCUMENTS

| JP | 11-076929 A | 3/1999 |
| JP | 2002-526615 A | 8/2002 |

(Continued)

OTHER PUBLICATIONS

English machine translation to EP 2583988 A1 to Guillotte; Apr. 24, 2013; 3 pages. (Year: 2013).*

*Primary Examiner* — Linda L Gray
(74) *Attorney, Agent, or Firm* — Maschoff Brennan

(57) ABSTRACT

The present invention relates to a method for manufacturing processed cork chips, and a floor construction method using the same. The processed cork chips are manufactured by the method, including: crushing and drying cork chips; adding polyurea to the dried cork chips to prepare a mixture; heating the mixture to cure the same; and cooling the cured mixture. Further, the floor construction method includes: laying the processed cork chips on the surface of a floor formed of concrete, a water-permeable base layer or crushed stone with a solidified top surface; and flattening the processed cork chips and pressing the same by means of a roller at a fixed temperature.

3 Claims, 1 Drawing Sheet

(51) Int. Cl.
    *B27M 1/08*    (2006.01)
    *B27M 3/04*    (2006.01)
    *B27N 3/02*    (2006.01)
    *B29C 65/00*   (2006.01)
    *B29C 65/48*   (2006.01)
    *B32B 37/12*   (2006.01)
    *C08L 75/02*   (2006.01)
    *E04B 5/43*    (2006.01)

(52) U.S. Cl.
    CPC .............. *B27N 3/02* (2013.01); *B29C 65/483* (2013.01); *B32B 37/12* (2013.01); *C08L 75/02* (2013.01); *E04B 5/43* (2013.01)

(56) References Cited

FOREIGN PATENT DOCUMENTS

| | | |
|---|---|---|
| KR | 10-2003-0066253 A | 8/2003 |
| KR | 10-0987339 B1 | 10/2010 |
| KR | 10-2014-0045853 A | 4/2014 |
| KR | 10-2016-0101237 A | 8/2016 |
| KR | 10-1707772 B1 | 2/2017 |

* cited by examiner

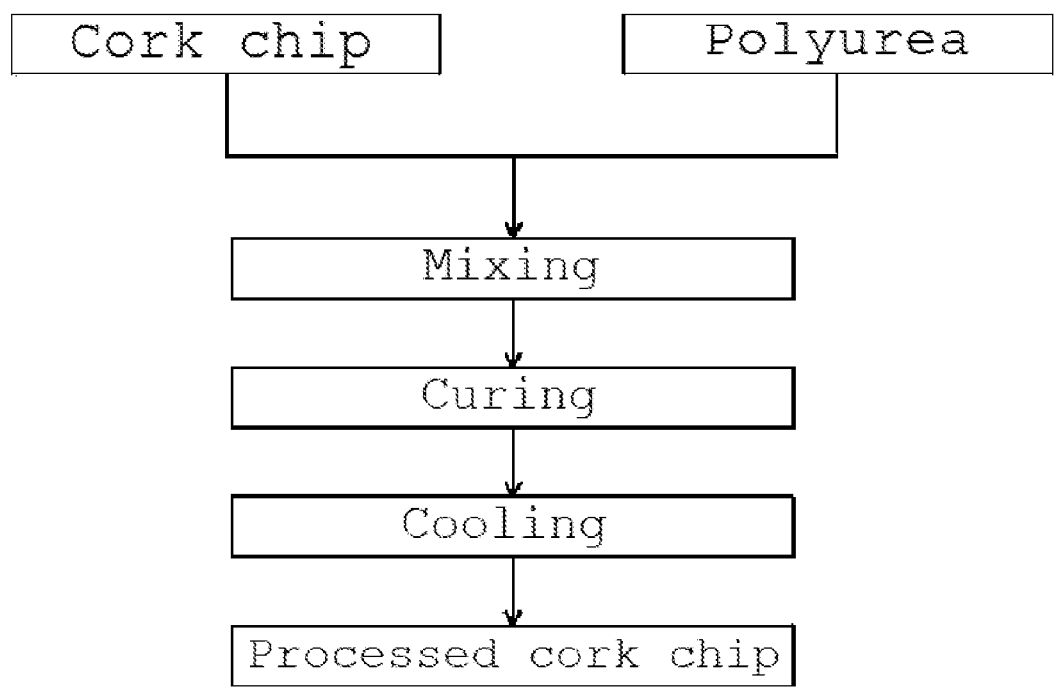

METHOD FOR MANUFACTURING PROCESSED CORK CHIP AND METHOD FOR CONSTRUCTING FLOOR USING SAME

FIELD OF INVENTION

The present invention relates to a method for manufacturing processed cork chips and a floor construction method using the same, and more particularly, to a method for manufacturing processed cork chips with improved dimensional change rate, tensile strength and elongation rate, while shortening a curing time to thus greatly enhance installation efficiency, as well as a floor construction method using the same.

BACKGROUND OF INVENTION

Cork chip is a natural material and is used as a floor construction material for playgrounds and buildings because of excellent physical properties thereof.

Korean Patent Publication No. 10-0987339 discloses that floor construction using a mixed cork composition, in which a polyurethane binder and a chip mixture of cork chips having at least two different particle sizes are admixed, can achieve construction with excellent physical properties. When such a composition is used, physical properties such as a tensile strength of 58.8 N/cm$^2$, a rebound resilience of 30%, a hardness of 60 and a drying time of 2 hours are obtained. There is a problem that physical properties of a floor after construction are not constant due to influences of temperature, humidity, etc. of the construction site.

Further, Korean Patent Laid-Open Publication No. 10-2016-0101237 discloses that cork chips and bamboo chips are mixed with a binder such as polyurethane resin or polyacrylic resin and used for floor construction, thereby improving physical strength and durability. However, such a composition also has a problem that uniform and desired processing results could not be offered in field construction.

On the other hand, Korean Patent Publication No. 10-1707772 discloses that cork chips manufactured by crushing and drying typical cork chips, mixing the dried cork chips with urethane resin and introducing an antimicrobial agent into the cork chip mixture, is used for floor construction. In this case, the cork chips are manufactured by injecting high-temperature water vapor to prevent the resin applied to the surface of the cork chips from being adhered thereto during curing, followed by cooling the same. The cork chips manufactured at a high temperature exhibit excellent physical properties such as a tensile strength of 1.5 to 2.0 MPa and a dimensional change rate of 0.2 to 0.3%. However, there is a problem in the actual construction that, according to additional processes such as adding a water-soluble curing accelerator, pressing a floor by means of a roller at a fixed temperature, etc. in order to increase a curing rate, the tensile strength and the dimensional change rate of the cork chip constituting the floor are decreased, in particular, the dimensional change rate is deteriorated by 0.5 to 1%.

PRIOR ART LITERATURE

Patent Literature (Patent Document 1) Korean Patent Publication No. 10-0987339
(Patent Document 2) Korean Patent Laid-Open Publication No. 10-2016-0101237
(Patent Document 3) Korean Patent Publication No. 10-1707772

SUMMARY OF INVENTION

Technical Problem to be Solved

The present disclosure has been proposed to overcome the aforementioned problems, and an object of the present disclosure is to provide a method for manufacturing cork chips, which are advantageous for long-term storage and offer simple construction since a curing time is fast by optimizing a binder resin during manufacture of the cork chips and adhesion does not occur after curing.

It is another object of the present invention to provide a floor construction method using cork chips, which has improved dimensional change rate since a floor formed using the cork chips exhibits excellent physical properties after actual construction.

It is also an object of the present invention to enhance performance of cork chips by optionally introducing an antimicrobial agent having discoloration and antibacterial and antiviral properties in regard to the cork chip.

Technical Solution

In order to solve the above problems, the present invention provides a method for manufacturing processed cork chips, comprising: crushing and drying cork chips; adding polyurea to the dried cork chips to prepare a mixture; heating the mixture to cure the same; and cooling the cured mixture.

At this time, the polyurea used herein is preferably silylated polyurea.

In addition, optionally, a pigment, antioxidant and antimicrobial agent may be further admixed in the mixture forming process.

The mixture forming process is characterized by mixing 100 wt. parts of cork chips with 50 to 80 wt. parts of polyurea.

The floor construction method using the processed cork chips of the present invention may include laying the processed cork chips on a floor surface made of concrete, a water permeable base layer or crushed stone with a solidified top surface, flattening the processed cork chips and pressing the same by means of a roller at a fixed temperature.

At this time, the processes of laying and pressing the processed cork chips are preferably repeated three times or more.

Effect of Invention

The method for manufacturing processed cork chips according to the present invention can optimize the binder resin in the production of cork chips, exhibit fast curing (that is a short curing time) while not causing adhesion after curing, thereby having advantages of long-term storage and simple construction.

Further, it is possible to provide a floor construction method using processed cork chips wherein the floor formed of the processed cork chips after actual construction exhibits excellent physical properties to thus greatly improve a dimensional change rate.

In addition, the performance of the processed cork chips may be enhanced by introducing an antimicrobial agent with discoloration, antibacterial and antiviral properties in regard to the cork chip.

BRIEF DESCRIPTION OF DRAWINGS

FIG. 1 is a flowchart illustrating a method for manufacturing processed cork chips according to the present invention.

DETAILED DESCRIPTION OF CONCRETE EMBODIMENTS OF INVENTION

Hereinafter, the present invention will be described in more detail. It is to be understood that the terms and words used in the detailed description and claims should not be construed as being limited to ordinary or dictionary terms, but should be construed as meanings and concepts consistent with the technical idea of the present invention, based on a principle that the inventor may appropriately define the concept of the terms in order to most preferably describe the invention.

The method for manufacturing processed cork chips according to the present invention may include crushing and drying cork chips, adding polyurea to the dried cork chips to form a mixture, curing the mixture, and cooling the cured mixture.

Such procedures of manufacturing the processed cork chips as described above are substantially identical to the prior art disclosed in Korean Patent Publication No. 10-1707772, however, the manufacturing processes are optimized herein to produce processed cork chips with physical properties suitable for solving the problems indicated in the present invention.

According to the present invention, polyurea is used to overcome limitations of polyurethane used as a binder in the prior art. Specifically, silylated polyurea is used, and more specifically, silylated polyurea having an amino terminal or an isocyanate terminal is used.

The amino terminal or the isocyanate terminal may react with water containing moisture in the atmosphere to form an amine group, and the formed amine group may react with the isocyanate terminal of another polyurea molecule to form a bond between urea, thereby considerably shortening the curing time. In addition, due to no further reaction with other polyurea molecules once curing is completed, cohesion and agglomeration of polyurea molecules may be prevented after application of polyurea to the surface of the cork chips.

Further, silylated polyurea may promote intermolecular bonding due to silane curing and prevent reaction with other polyurea after curing is finished. Therefore, cohesion and agglomeration of the silylated polyurea may be inhibited after being applied to the surface of the cork chips.

In the cork chip crushing and drying processes, crushing may be conducted using a coater and drying may be conducted by introducing hot air into the coater. Drying the crushed cork chips with hot air may remove moisture, and the heated cork chips may decrease a viscosity of urea resin, which in turn enables the resin to quickly and deeply penetrate the cork chips.

Indeed, the urea resin used in the present invention is superior in curing performance over the urethane resin used in the prior art and, therefore, it is not necessary to strictly control a water content of the cork chip. Instead, for example, applying hot air to 1 kg of cork chips for 10 to 30 minutes sufficiently improves processing time or process efficiency.

Next, polyurea is added to the dried cork chips in order to prepare a mixture. As described above, the polyurea used herein is silylated polyurea, which can be synthesized from polyamines and isocyanates.

The isocyanate may include diisocyanates or triisocyanates of aliphatic, cycloaliphatic, araliphatic and/or aromatic compounds. Specific examples thereof may include hexamethylene 1,6-diisocyanate (HDI), HDI uretdione, HDI isocyanurate, HDI burette, HDI allophanate, 1-isocyanato-3,3,5-trimethyl-5-isocyanatomethylcyclohexane, 2,4- and/or 2,6-tolylene diisocyanate and/or 4,4'-, 2,4'- and/or 2,2'-diphenylmethane diisocyanate, m-xylene diisocyanate, m-tetramethylxylene diisocyanate, p-tetramethylxylene diisocyanate, 4,4'-dicyclohexylmethane diisocyanate, naphthalene-1,5-diisocyanate, cyclohexane 1,4-diisocyanate, hydrogenated xylylene diisocyanate, 1-methyl-2,4-diisocyanatocyclohexane, tetramethoxybutane 1,4-diisocyanate, butane 1,4-diisocyanate, 1,6-diisocyanato-2,2,4-trimethylhexane, 1,6-diisocyanato-2,4,4-trimethylhexane, 1-isocyanato-1-methyl-4(3)-isocyanatomethylcyclohexane and 1,12-dodecane diisocyanate, 4-dichlorophenyl diisocyanate, dicyclohexylmethane 4,4'-diisocyanate, m-phenylene diisocyanate, p-phenylene diisocyanate, 4-chloro-1,3-phenylene diisocyanate, 1,6-hexamethylene diisocyanate, 1,10-decamethylene diisocyanate, lysine alkylester diisocyanate, 3,3'-dimethyl-4,4'-diphenylmethane diisocyanate, xylylene diisocyanate, tetramethylxylylene diisocyanate, 1,5-tetrahydronaphthalene diisocyanate, toluene triisocyanate, methylenebis(cyclohexyl) 2,4'-diisocyanate and 4-methylcyclohexane-1,3-diisocyanate, any one of which may be applied.

Further, the polyamine may include hydrazine, hydrazine hydrate and substituted hydrazine. Specific examples thereof may include N-methylhydrazine, N,N'-dimethylhydrazine, adipic acid, methyladipic acid, sebacic acid, hydracrylic acid, terephthalic acid, acid hydrazide of isophthalic acid, 13-semicarbazidopropionyl hydrazide, 2-semicarbazidoethyl-carbazin ester and 13-aminoethyl semicarbazide carbonate, any one of which may be applied.

Further, a silylation component for preparing the silylated polyurethane may include alkoxysilane having an isocyanate group or an alkoxysilane group.

Examples of the alkoxysilane containing an isocyanate group may include isocyanatopropyltriethoxysilane, isocyanatopropyltrimethoxysilane, isocyanatopropylmethyldiethoxysilane, isocyanatopropylmethyldimethoxysilane, isocyanatomethyltrimethoxysilane, isocyanatomethyltriethoxysilane, isocyanatomethylmethyldiethoxysilane, isocyanatomethylmethyldimethoxysilane, isocyanatomethyldimethylmethoxysilane, and isocyanatomethyldimethylethoxysilane, any one of which may be applied.

Further, preferable examples of alkoxysilane containing an amino group may include 3-aminopropyltrimethoxysilane, 3-aminopropyltriethoxysilane, 3-aminopropylmethyldimethoxysilane, 3-aminopropylmethyl diethoxysilane, 3-amino-2-methylpropyltrimethoxysilane, 4-aminobutyltrimethoxysilane, 4-aminobutylmethyldimethoxysilane, 4-amino-3-methylbutyltrimethoxysilane, 4-amino-3,3-dimethylbutyl trimethoxysilane, 4-amino-3,3-dimethylbutyldimethoxymethylsilane, aminomethyltrimethoxysilane, aminomethyldimethoxymethylsilane, aminomethylmethoxydimethylsilane, aminomethyltriethoxysilane, aminomethyldiethoxymethylsilane, aminomethylethoxydimethylsilane, N-methyl-3-aminopropyltrimethoxysilane, N-methyl-3-aminopropyldimethoxymethylsilane, N-ethyl-3-aminopropyltrimethoxysilane, N-ethyl-3-aminopropyldimethoxymethylsilane, N-butyl-3-aminopropyltrimethoxysilane, N-butyl-3-aminopropyldimethoxymethylsilane, N-cyclohexyl-3-aminopropyltrimethoxysilane, N-cyclohexylaminomethyltriethoxysilane, cyclohexylaminomethyltrimethoxysilane, N-phenyl-3-aminopropyltrimethoxysilane, N-methyl-3-amino-2-methylpropyltrimethoxysilane, N-methyl-3-amino-2-methylpropyldimethoxymethylsilane, N-ethyl-3-amino-2-methylpropyltrimethoxysilane, N-ethyl-3-amino-2-methylpropyldimethoxymethylsilane, N-ethyl-3-aminopropyldimethoxymethylsilane, N-ethyl-3-aminopropyltrimethoxysilane, N-phenyl-4-aminobutyltrimethoxysilane, N-phenylaminomethyldimethoxymethylsilane, N-phenylaminomethyltrimethoxysilane, N-cyclohexylaminomethyldimethoxymethylsilane, N-cyclohexylaminomethyltrimethoxysilane, N-methylaminomethyldimethoxymethylsilane, N-methylaminomethyltrimethoxysilane, N-ethylaminomethyldimethoxymethylsilane, N-ethylaminomethyltrimethoxysilane, N-propylaminomethyldimethoxymethylsilane, N-propylaminomethyltrimethoxysilane, N-butylaminomethyldimethoxymethylsilane, N-butylaminomethyltrimethoxysilane, N-(2-aminoethyl)-3-aminopropyltrimethoxysilane, N-(2-aminoethyl)-3-aminopropylmethyldimethoxysilane, 3-[2-(2-aminoethylamino)ethylamino]propyltrimethoxysilane, bis(trimethoxysilylpropyl)amine, bis(dimethoxy(methyl)silylpropyl)amine, bis(trimethoxysilylmethyl)amine, bis(dimethoxy(methyl)silylmethyl)amine, 3-ureidopropyltrimethoxysilane, N-methyl[3-(trimethoxysilyl)propyl]carbamate, N-trimethoxysilylmethyl-O-methylcarbamate and N-dimethoxy(methyl)silymethylcarbamate, any one of which may be applied.

In addition, in order to prevent discoloration and ensure antimicrobial activity before the mixture is cured in the process of mixing polyurea, a pigment and an antimicrobial agent may be further added. As a means of ensuring anti-discoloration and antimicrobial activities while maintaining physical properties of cork such as elasticity by such additional components, filler may be introduced into the resin, which is adsorbed to the resin so as to desirably function on the surface of the cork chips.

In addition, in order to serve as the filler, the pigment may include pigment particles prepared by applying an organic pigment to the surface of inorganic particles of any one selected from silica, barium sulfate, barium titanate, talc, clay, magnesium carbonate, calcium carbonate, aluminum oxide, aluminum hydroxide and mica. When such a pigment is used, effects of using the filler while imparting color may be simultaneously offered only by addition of the pigment particles without using an alternative filler. Further, an eco-friendly powder may be used as the antibacterial agent.

In the process of forming the mixture, polyurea is applied to the surface of the cork chips in the coater, and the polyurea is cured on the surface during curing. In the prior art, hot steam (or water vapor) is injected using a water vapor supplier in order to solve a problem of cohesion between cork chips in the curing process. On the other hand, the present invention adopts simple application of polyurea without supplying hot water vapor, thereby simplifying the process.

The curing may be performed by kneading cork chips admixed with polyurea while maintaining an internal temperature of the coater at 60 to 80° C. for 30 minutes to 1 hour. However, in order to inhibit cohesion of cork chips, an impeller mounted inside the coater is preferably operated at a speed of 100 to 200 rpm, preferably, 100 to 120 rpm, to maintain a kneading state. If the kneading speed is excessively high, polyurea may escape from the surface before curing due to collision between the cork chips or pulverized powder of the cork chips may be generated due to abrasion of the cork chips. Therefore, the kneading speed should not be too high. On the other hand, if the kneading speed is too low, the cork chips may be agglomerated to form a mass of cork chips due to cohesion thereof. Therefore, it is necessary to operate the impeller at the specific speed described above.

After the cork chips admixed with polyurea are cured, external air is injected into the coater to cool the same. In the prior art, since hot water vapor is supplied and causes a difficulty in cooling after water vapor supply, cooling is typically conducted in two stages.

However, according to the present invention, the impeller in the coater is operated to knead the mixture at a speed of 50 to 100 rpm and sufficiently cooled by only injecting external air at room temperature, so that the cork chips are not adhered or agglomerated together during cooling.

A floor construction method using the processed cork chips prepared as described above may be performed by: laying processed cork chips, which were made of polyurea and cork chips, otherwise, polyurea, pigment, an antimicrobial agent and cork chips, on a floor surface formed of concrete, a water permeable base layer or crushed stone with a solidified top surface; and flattening the floor and processing the same by means of a roller at a fixed temperature.

Herein, after laying and pressing the processed cork chips, these processes may be repeated, preferably, 3 to 5 times, thereby ensuring sufficient physical properties of the cork chips after floor construction.

Further, if the floor is a two-stepped floor on which a base layer is formed on a crushed stone layer, a primer or a urethane binder for cork and a thinner are diluted at a weight ratio of 5:4 and then sprayed over the crushed stone to prepare a solidified layer; unprocessed cork chips having a particle size of 5 to 7 mm and polyurea are mixed at a weight ratio of 5:1 to prepare a bottom layer, followed by placing the bottom layer on top of the solidified layer; 1 liter of a curing accelerator is mixed in 200 liters of water, followed by spraying the mixture over the bottom layer and quickly curing the same; and the processed cork chips of the present invention may be applied to the floor prepared as above, thereby completing floor construction.

Further, if the floor has a crushed stone compact surface, a primer or a urethane binder for cork and a thinner are diluted at a weight ratio of 5:4 and then sprayed over crushed stone; unprocessed cork chips having a particle size of 5 to 7 mm and urethane resin are mixed at a weight ratio of 3:1, followed by quickly curing the same; immediately, a curing accelerator in an amount of 0.002% by weight of the binder is added to the top of the cured layer, followed by quickly curing the same; and then the processed cork chips of the present invention may be applied to the floor prepared as above, thereby completing floor construction.

Further, when the floor is made of one among concrete, water-permeable concrete and asphalt, a urethane binder for cork and a thinner are diluted at a weight ratio of 5:4 and then applied to the top of a base layer; 100 wt. parts of the processed cork chips of the present invention and 8 to 10 wt. parts of the urethane binder are sprayed over the base layer, followed by flattening and then pressing the same by means of a roller at a fixed temperature, thereby completing floor construction.

In order to test construction efficiency of the processed cork chips according to the present invention, 100 wt. parts of cork chips and 70 wt. parts of polyurea were mixed, cured and cooled to produce processed cork chips, followed by applying the processed cork chips to a two-stepped floor wherein a base layer is formed on top of a crushed stone layer. The constructed floor was subjected to assessment of physical properties.

With respect to the silylated polyurea used herein, isocyanatopropyl triethoxysilane is used as an isocyanate compound for polyurea synthesis to thus produce polyurea containing a free isocyanate group, which in turn is used in the present invention.

The processed cork chips were used for floor construction three times, and a sample was taken each time. 20 processed cork chip layers (10×10×5 cm) after curing were selected as samples, and each sample was subjected to measurement of tensile strength (measured in accordance with GRM 6004: 2008), a dimensional change rate (left at 75° C. for 48 hours), elongation and a curing time. Results thereof are shown in Table 1.

TABLE 1

|  | First coating | Second coating | Third coating |
| --- | --- | --- | --- |
| Dimensional change rate (%) | 0.04 | 0.025 | 0.015 |
| Tensile strength (MPa) | 0.7 | 1.0 | 1.1 |
| Elongation (%) | 10 | 11 | 12 |
| Curing time (min) | 30 | 20 | 15 |

For the sake of comparison, a cured product manufactured using the processed cork chips according to the prior art was tested. The processed cork chips were produced by the method according to Korean Patent Publication No. 10-1707772. More particularly, 100 wt. parts of cork chips and 70 wt. parts of urethane resin were mixed, followed by injecting water vapor into the mixture, curing the mixture and cooling the same in two stages, thereby obtaining the processed cork chips.

The processed cork chips were used for floor construction three times, and a sample was taken each time. The test was carried out under the same conditions as in Table 1. Results thereof are shown in Table 2.

TABLE 2

|  | First coating | Second coating | Third coating |
| --- | --- | --- | --- |
| Dimensional change rate (%) | −0.045 | −0.040 | −0.032 |
| Tensile strength (MPa) | 0.6 | 0.8 | 1.0 |
| Elongation (%) | 11 | 13 | 15 |
| Curing time (min) | 30 | 25 | 20 |

When the results of Table 1 and Table 2 are compared, it could be understood that floor construction using the conventionally processed cork chips shows inferior results to floor construction using the processed cork chips of the present invention, in terms of dimensional change rate, tensile strength, elongation and curing time. Specifically, the floor construction using the conventionally processed cork chips did not achieve significant improvement in dimensional change rate, tensile strength and elongation even when the number of coatings was increased, and the curing time was not considerably reduced.

Accordingly, the processed cork chips of the present invention have been found to exhibit superior physical properties in floor construction, and are suitable for floor construction that can prevent noise from the floor of a children's playground or floor noise of buildings.

While the present invention has been particularly illustrated and described with reference to exemplary embodiments thereof, it is to be understood that the invention is not limited to the disclosed exemplary embodiments and that various changes and modifications may be possible by those skilled in the art without departing from the spirit and scope of the invention. Such variations and modifications are considered to be within the scope of the invention and the appended claims.

The invention claimed is:

1. A method for manufacturing processed cork chips, comprising:
   crushing and drying cork chips;
   preparing a mixture by adding silylated polyurea having an isocyanate terminal to the crushed and dried cork chips to prepare the mixture;
   heating the mixture to cure the mixture and form a cured mixture, including kneading the cork chips admixed with the polyurea at 100 to 200 rpm and heating the mixture at 60 to 80° C. for 30 minutes to 1 hour; and
   cooling the cured mixture, including by introducing external air at room temperature for 30 minutes to 1 hour while kneading the cured mixture at 50 to 00 rpm.

2. The method according to claim 1, wherein preparing the mixture includes further adding a pigment and an antimicrobial agent thereto.

3. The method according to claim 1, wherein preparing the mixture is conducted by mixing 100 parts by weight of the crushed and dried cork chips and 50 to 80 parts by weight of the silylated polyurea.

* * * * *